United States Patent
Biskeborn et al.

(10) Patent No.: US 7,681,793 B2
(45) Date of Patent: Mar. 23, 2010

(54) MULTI-FORMAT MAGNETIC HEAD

(75) Inventors: Robert Glenn Biskeborn, Hollister, CA (US); Calvin Shyhjong Lo, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 901 days.

(21) Appl. No.: 11/213,548

(22) Filed: Aug. 26, 2005

(65) Prior Publication Data
US 2007/0047146 A1 Mar. 1, 2007

(51) Int. Cl.
G06K 7/08 (2006.01)
G06K 19/06 (2006.01)

(52) U.S. Cl. .................. 235/449; 235/493
(58) Field of Classification Search .............. 235/449, 235/493; 360/61, 121, 122
See application file for complete search history.

(56) References Cited

U.S. PATENT DOCUMENTS

| | | | |
|---|---|---|---|
| 4,843,485 A | 6/1989 | Reitmeier | 360/9.1 |
| 5,245,485 A | 9/1993 | Dunn et al. | 360/69 |
| 5,436,780 A * | 7/1995 | Nagata et al. | 360/121 |
| 5,905,613 A | 5/1999 | Biskeborn et al. | 360/130.21 |
| 6,172,829 B1 | 1/2001 | Ozaki et al. | 360/48 |
| 6,172,837 B1 | 1/2001 | Fasen | 360/75 |
| 6,188,532 B1 | 2/2001 | Albrecht et al. | 360/63 |
| 6,331,920 B1 | 12/2001 | Albrecht et al. | 360/63 |
| 6,639,753 B1 | 10/2003 | Henze et al. | 360/121 |
| 6,992,857 B2 | 1/2006 | Knowles et al. | 360/77.12 |
| 7,154,691 B2 * | 12/2006 | Girvin et al. | 360/61 |
| 2005/0842407 | 4/2005 | Saliba et al. | 242/332.4 |
| 2005/0134989 A1 | 6/2005 | Girvin et al. | 360/61 |

FOREIGN PATENT DOCUMENTS

| | | |
|---|---|---|
| CN | 01132700.6 | 5/2007 |
| EP | 1148738 A1 | 10/2001 |
| WO | WO 01/04725 A2 | 1/2001 |

* cited by examiner

*Primary Examiner*—Daniel A Hess
(74) *Attorney, Agent, or Firm*—Zilka-Kotab, PC

(57) ABSTRACT

A magnetic head includes a first array of elements associated with a first data format and a second array of elements associated with a second data format, the elements being selected from a group consisting of readers, writers, and combinations thereof. The first and second arrays of elements are adjacent each other in a direction transverse to a direction of travel of a magnetic medium over the head.

32 Claims, 10 Drawing Sheets

MULTI-FORMAT MAGNETIC HEAD

RELATED APPLICATIONS

This application is related to U.S. Patent Application entitled "FLAT PROFILE TAPE HEAD" to Biskeborn, filed concurrently herewith, and U.S. Patent Application entitled "MAGNETIC HEAD WITH PLANAR OUTRIGGER" to Biskeborn et al., filed concurrently herewith.

FIELD OF THE INVENTION

The present invention relates to magnetic head structures, and more particularly, this invention relates to a magnetic head structure capable of reading and/or writing in multiple formats.

BACKGROUND OF THE INVENTION

Business, science and entertainment applications depend upon computing systems to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

FIG. 2A illustrates the tape bearing surface 109 of one of the modules 104. The tape 108 is shown in dashed lines. The module is long enough to be able to support the tape as the head steps between data tracks.

As shown, the tape 108 includes four data bands (Band 0-3) that are defined between servo tracks 202. Each data band may include a number of data tracks, for example 96 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations. Typically, a coarse positioner (worm gear, etc.) places the head generally adjacent a given data track, then a fine positioner (voice coil, etc.) keeps the heads aligned using the servo tracks.

FIG. 2B depicts a plurality of read/write elements 106 formed in a gap 208 on the module 104 of FIG. 2A. As shown, the array of elements 106 includes, for example, eight writers 209, eight readers 210 and two servo readers 212. As noted by considering FIGS. 1 and 2A-B together, each module 104 will include a complementary set of elements 106.

One designing magnetic storage systems, such as tape storage systems, strives to increase the data density of the medium. As a means for adding more data to a given area of a magnetic medium, succeeding generations of data formats are born. Typically, newer formats may include more data bands as well as more data tracks per data band and/or width of the tape, and also improvements in data linear density.

On any head, both the spacing between the elements and the element dimensions conform to a particular data format. Usually, a head designed for one format will not work with a tape written in another format, as the servo readers usually will not align with the servo tracks. In addition the data elements may not align with the written tracks. Accordingly, one wishing to keep data stored on a magnetic medium in one format but wishing to move to equipment in a new format must either keep an operational drive designed for the earlier format, or transfer the data to a medium in the new format.

One known attempt to provide a multi-format head 300 is shown in FIG. 3. As shown, the head 300 includes four modules 302A, 302B, 303A, 303B aligned parallel to the direction of tape travel. The outer pair of modules 302A, 302B each have an array of elements 304A, 304B arranged according to a first data format, while the inner pair of modules 303A, 303B each have an array of elements 306A, 306B for a second data format, the second data format different than the first data format. In both pairs, the complementary elements (304A with 304B, 306A with 306B) are displaced from each other in the direction of tape travel. However, these types of heads are very expensive to manufacture, as several independent modules 302A, 302B, 303A, 303B must first be fabricated. Also, once manufactured, the modules 302A, 302B, 303A, 303B must be precisely aligned, considering the critical wrap angles between the modules as well as the outer wrap angles. In addition, because of the larger spacing between the outer modules 302A, 302B, the head will be more susceptible to errors due to tape wobble. For example, in read-while-write operation, the readers on the trailing module 302B read the data that was just written by the leading module 302A so that the system can verify that the data was written correctly. If the data is not written correctly, the system recognizes the error and rewrites the data. However, the tape does not move across the head perfectly linearly. Rather, the tape may shift back and forth, or "wobble," as it crosses the tape bearing surfaces, resulting in dynamic skew, or misalignment of the trailing readers with the leading writers. The farther the readers are behind the writers, the more chance that track misregistration will occur. If it does occur, the system may incorrectly believe that a write error has occurred.

Another known attempt to provide a multi-format head 400 is shown in FIG. 4. This tape head 400 is configured as a Read-Read-Write (R-R-W) head. Tape head 400 includes merged primary data format read/write elements 404A, 404B and secondary data format read elements 406A, 406B on each module 402A, 402B. In this instance, head 400 is capable of reading a secondary format corresponding to secondary format read elements 406A, 406B. Head 400 is further capable of both reading and writing with the primary format corresponding to primary read/write elements 404A, 404B.

With continued reference to FIG. 4, the primary and secondary elements 404A, 404B, 406A, 406B are aligned parallel to the direction of tape travel. Typically, each row of elements is fabricated in sequential fabrication sequences. For example, elements 404A, 404B may be formed first. Then the secondary elements 406A, 406B are fabricated above the primary elements 404A, 404B. However, this type of "stacked" head is complex and expensive to fabricate, as each row of elements 404A, 404B, 406A, 406B must be fabricated independently. Further, an error in processing late in the fabrication process can result in an expensive loss. Additionally, the electrical connections that would be necessary to traverse the multiple layers for so many devices would be very complex.

In addition to fabrication issues, modules implementing stacked rows of element also suffer from reliability issues. For instance, the head will run hotter, as the heat sinking effect of the substrate will be reduced. Particularly, if the upper array is being used, heat will have to travel through several layers of devices do reach the substrate. A further issue is the thick gap that would be required in order to accommodate stacked arrays. Tape irregularities tend to droop slightly into this gap and erode the elements. This produces head-tape spacing problems, such as declining signal resolution. Gap wear can also lead to debris deposition issues such as shorting.

There is accordingly a clearly-felt need in the art for a magnetic head assembly capable of reading and/or writing in multiple formats, yet that is simple and less expensive to manufacture. It would be desirable to be able to read multiple formats for such things as backward compatibility, as well as compatibility across competing formats. These unresolved problems and deficiencies are clearly felt in the art and are solved by this invention in the manner described below.

SUMMARY OF THE INVENTION

A magnetic head according to one embodiment includes a first array of elements associated with a first data format and a second array of elements associated with a second data format, the elements being selected from a group consisting of readers, writers, and combinations thereof. The first and second arrays of elements are adjacent each other in a direction transverse to a direction of travel of a magnetic medium over the head.

For example, the first and second arrays may include readers, the readers being preferably aligned along a line transverse to the direction of travel of the magnetic medium over the head. The first and second arrays may also or alternatively include writers, the writers being preferably aligned along a line transverse to the direction of travel of the magnetic medium over the head. The readers and/or writers of both arrays are preferably formed in a same processing sequence. The second array may be a scaled version of the first array. The elements of the second array may vary from the elements of the first array by element size and/or by spacing between adjacent elements.

In one embodiment, a third array of elements is associated with a third data format, the third array being adjacent the first or second array in a direction transverse to a direction of travel of a magnetic medium over the head. The third array may also be associated with the second data format.

In some embodiments, the first and second arrays share a servo reader. In other embodiments, they do not share a servo reader. In the latter configuration, the first and second arrays can be spaced apart in the direction transverse to the direction of media travel.

In some embodiments or methods of use, only one of the arrays is active during operation of the head. In other embodiments or methods of use, both of the arrays are active during operation of the head. Where both arrays are active, data in the first and second formats can written and/or read simultaneously by the first and second array.

A magnetic head according to another embodiment includes a second module aligned with the first module parallel to the direction of travel of the magnetic medium, the second module having a third array of elements associated with the first data format, and a fourth array of elements associated with the second data format, the elements being selected from a group consisting of readers, writers, and combinations thereof, wherein the third and fourth arrays of elements are adjacent each other in a direction transverse to the direction of travel of the magnetic medium over the head.

A tape drive system includes a head as recited above, a drive mechanism for passing a magnetic recording tape over the head, and a controller in communication with the head. The system may further include an outer tape guide for setting a wrap angle of the tape relative to the second (outrigger) tape bearing surface.

Methods for using such heads are also presented. One illustrative method includes determining a format of data on a medium, selecting one of the arrays of elements to read the data on the medium based on the determined format of the data, and positioning the selected array over the data on the medium.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

Prior Art

BEST MODE FOR CARRYING OUT THE INVENTION

Figure 1:
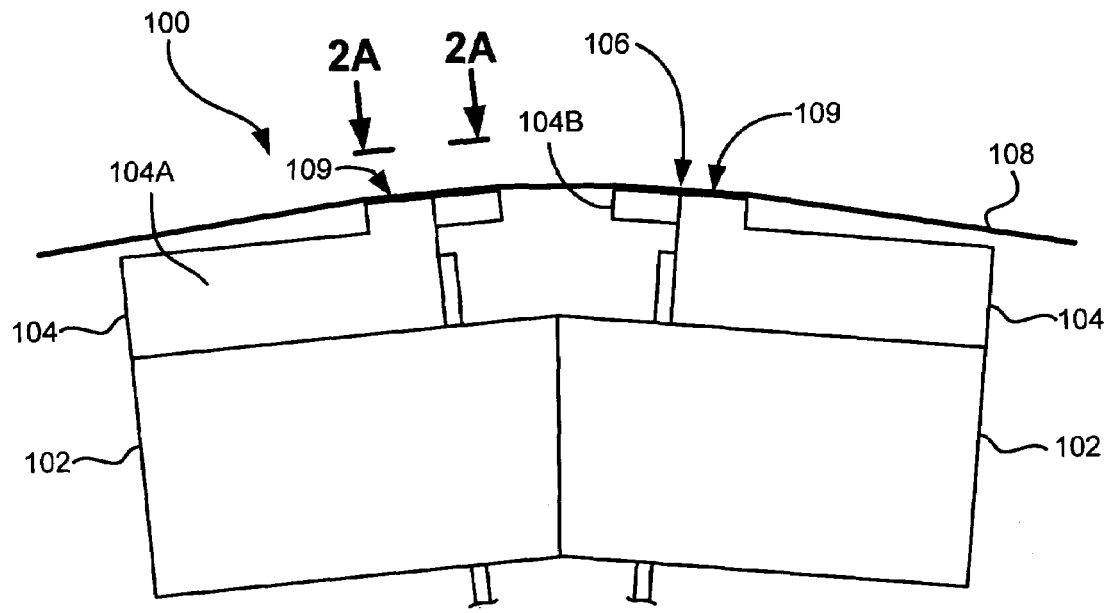
FIG. 1 is a side view of a traditional flat-lapped magnetic tape head, in accordance with the prior art.
Figure 2B:
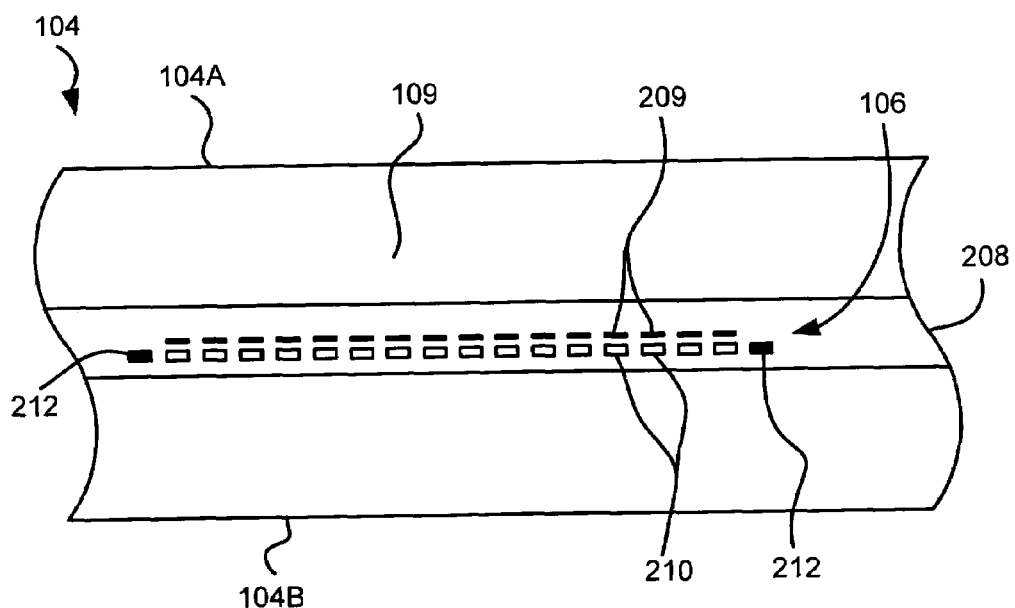
FIG. 2B is a detailed view taken from Circle 2B of FIG. 2A.
Figure 2A:
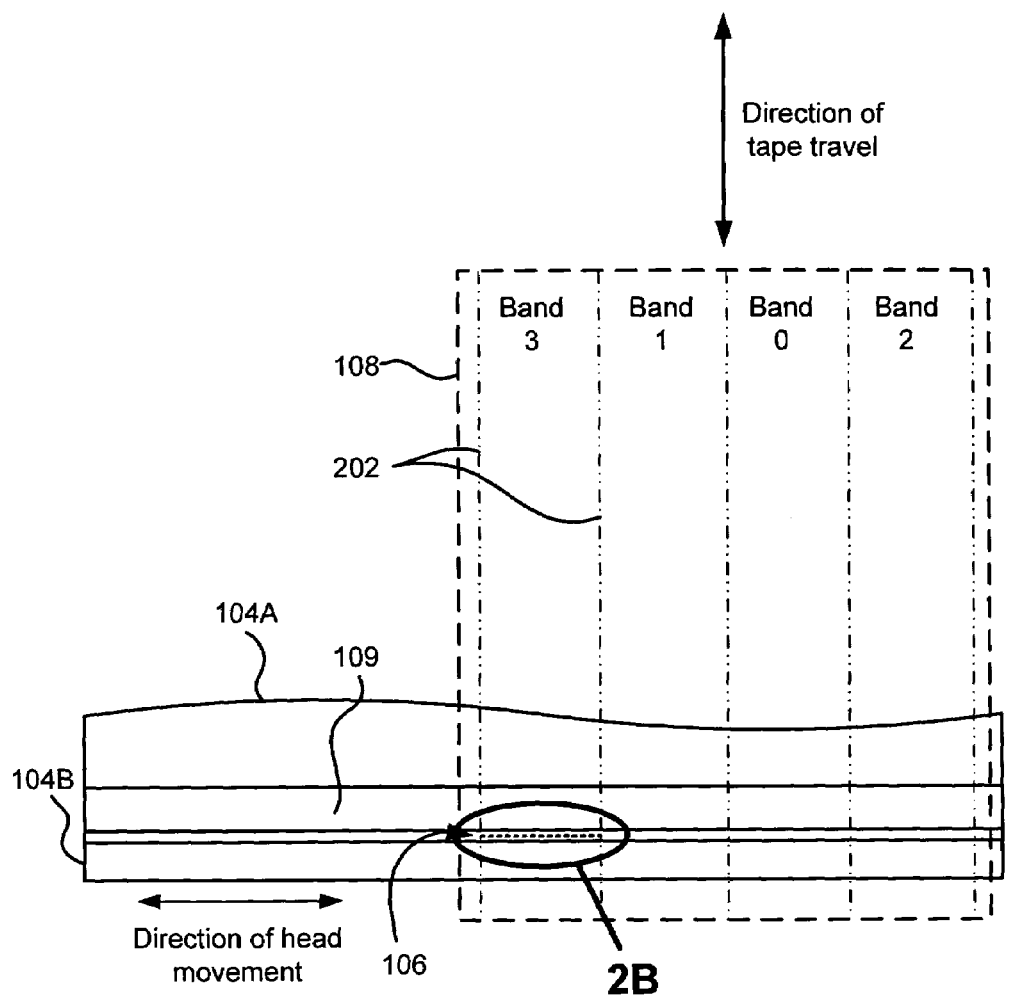
FIG. 2A is a tape bearing surface view taken from Line 2A of FIG. 1.
Figure 4:
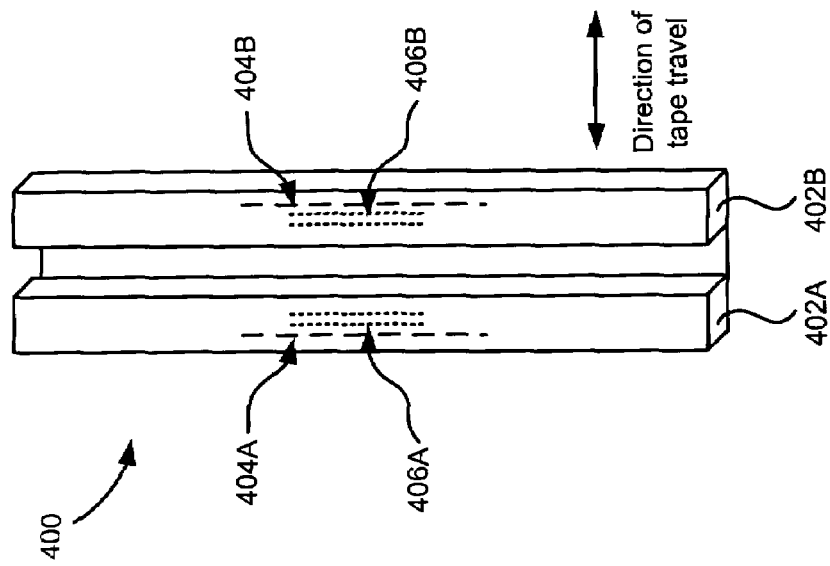
FIG. 4 is a tape bearing surface view of a head including multiple format read/write element arrays on the same module.
Figure 3:
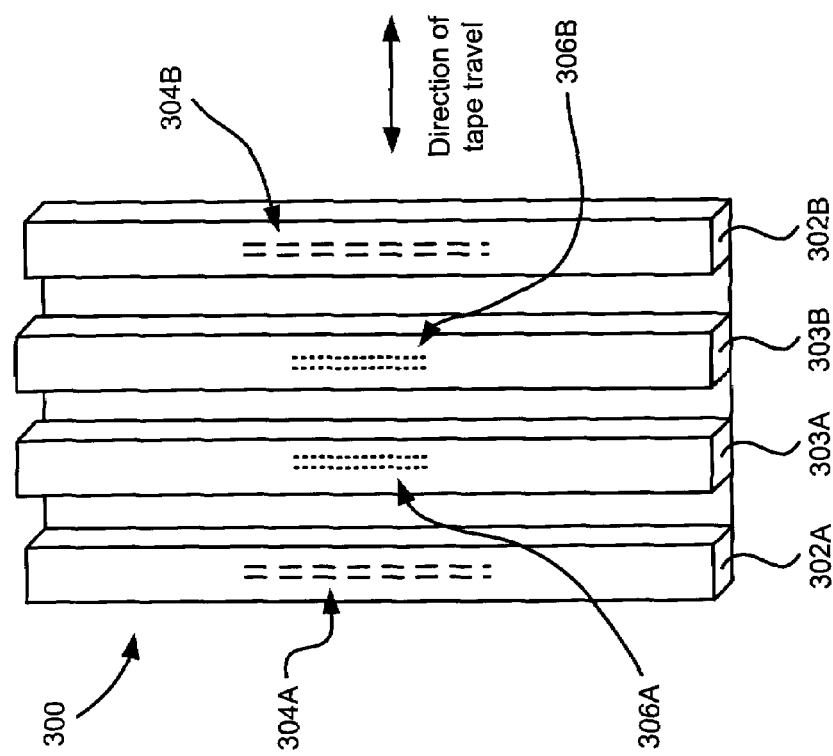
FIG. 3 is a tape bearing surface view of a head including multiple format read/write elements on different modules.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new head design that is capable of reading and/or writing to magnetic media such as magnetic tape in multiple formats. For example, the head can write and/or read data in both legacy and advanced formats, and in doing so can enable full backward compatibility with legacy media types. This is an important criterion for customers wishing to move to a new format yet having data stored on media in an older format. This is accomplished by equipping the head with two arrays of elements (readers and/or writers), each array being associated with a different format. The first and second arrays of elements are generally aligned laterally adjacent each other in a direction transverse to a direction of travel of a magnetic medium over the head. Depending on the format, the proper array is aligned with a given data band in a conventional way, e.g., by servoing.

While the following description will be described in terms of a tape storage system for clarity and to place the invention in context, it should be kept in mind that the teachings herein may have broad application to all types of magnetic recording.

As mentioned above with reference to FIG. 1, a typical tape head includes two modules, each module having an array of data elements thereon for reading and/or writing data in a particular data format. The present invention includes a new two module head capable of reading and/or writing in two different data formats. One skilled in the art will also appreciate that the embodiments herein can also be expanded to heads having a single module (where, for example, the single module may be formed on a single substrate) and heads having more than two modules. The latter are described in more detail below.

Figure 5:
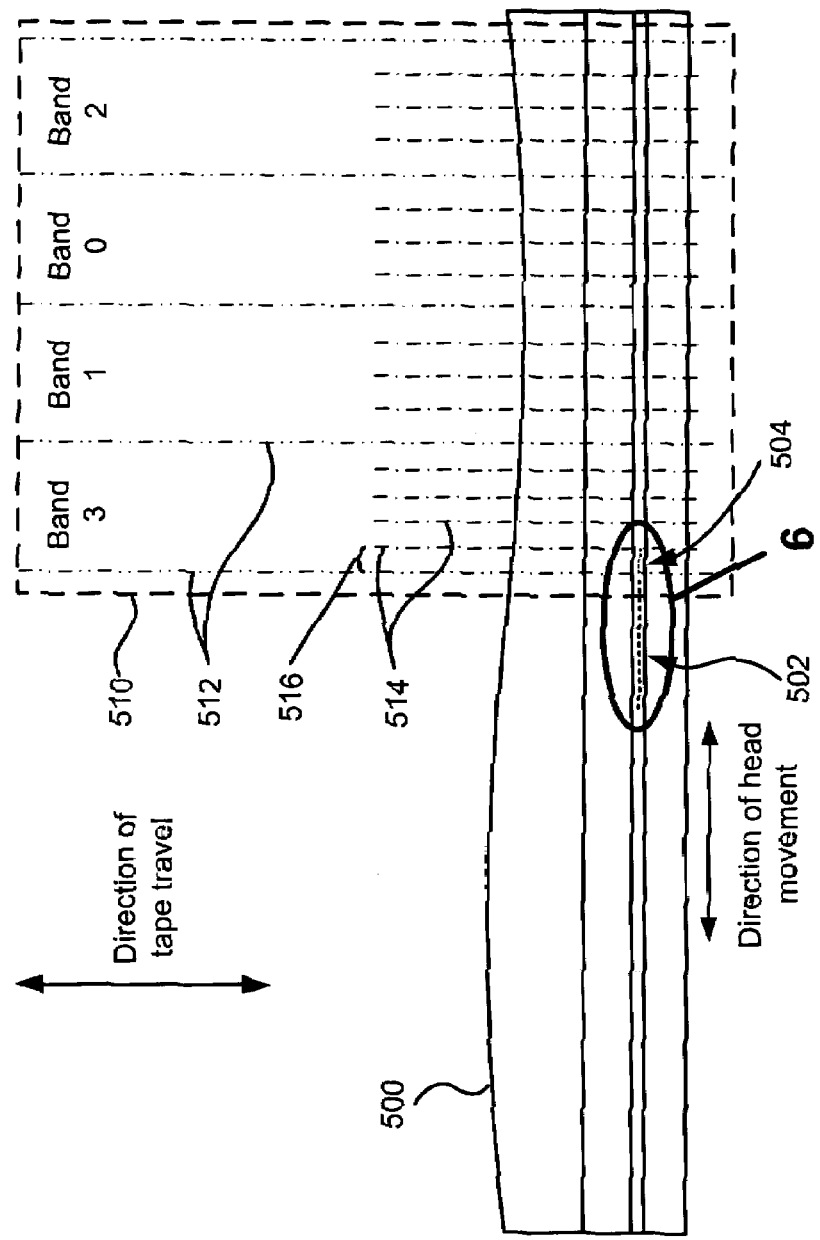
FIG. 5 is a tape bearing surface view of a tape head including two arrays of elements on the same module, each array being adapted for a different format.

FIG. 5 illustrates a tape bearing surface view of a module 500 having a first array 502 of elements associated with a first data format, and a second array 504 of elements associated with a second data format, where the first and second data formats are different. Again, the elements can include readers, writers, or both. The tape 510 is shown in dashed lines. While it is not typical to write data in two different formats on the same tape, the present embodiment would enable this feature, as described below. To illustrate different formats, FIG. 5 shows data in the first and second formats overlapping. This is for illustration purposes, and one skilled in the art will appreciate that the data bands in the two formats would not typically be concurrently present on the same area of the tape. Data in the first format is associated with servo tracks 512 and data bands (Band 0-3). Data in the second format is associated with servo tracks 512 and 514. The data bands 516 in the second format are significantly smaller and so are not individually identified alphanumerically. However, a representative data band 516 is shown in FIG. 5 for illustrative purposes.

The second data format may be a new generation relative to the first data format. The first and second data format may also be a formats used by competing vendors, used in different standards, etc. Typically, the differences between formats will include one or more of: differing servo band locations, differing written track width, differing track density per data band or tape width, differing track centerline-to-centerline spacing, differing element centerline-to-centerline spacing, etc. Accordingly, the arrays will have servo reader position, element spacing, element width, etc. that are designed to function in the format with which associated.

In one embodiment, the second format is a scaled-down version of the first format, especially in feature size. Accordingly, the second array 504 is a scaled-down version of the first array 502. For example, the second array 504 may have the same number of data tracks per band, but is scaled down from the first array 502, for example by a factor of about 5. In other words, the second array 504 is about 20% the width of the first array 502. Thus, the format characteristics are also scaled down. For example, the track density on the tape should increase by approximately 5× in the second format as compared to the first format. If the linear data density also doubles, the tape capacity in the second format will be 10× the first format.

Furthermore, the advanced format data organization, e.g. track layout, is not necessarily in any way coupled to the legacy format. Coupling as by forcing a sharing of elements is not desirable as it may force compromised future areal density or degraded head performance.

With continued reference to FIG. 5, the first and second arrays 502, 504 are formed in the same gap on the module 500 and are generally aligned generally laterally adjacent to each other in a direction transverse to the direction of media travel.

In operation, the tape drive system or host system can identify the format of the servo pattern on the tape and/or the format of the data on the tape using one of several techniques. One way to determine the format(s) is by reading a cartridge memory chip in the tape cartridge that identifies the format. Another way to identify the format is by reading a small portion of the data bands and matching, for example, the servo tracks to a look up table (LUT). Note that all arrays may be active at this time, or the system may sequentially operate the arrays. In other embodiments, the user may indicate which format is used on the tape. Once the format is identified, the controller, host, or user selects the proper array for reading and writing. The system energizes the array associated with the identified format, such as by energizing the leads coupled to the desired array. Now active, the desired array is aligned with one of the data bands in a standard way, e.g., by servoing, and the tape is passed over the head for reading/writing. Preferably, either one array or the other is energized at a time during standard read/write operations.

In one embodiment, the elements for both arrays 502, 504 are built simultaneously during thin film buildup. For instance, consider elements in a "piggyback" configuration. This type of element typically includes a reader formed on a substrate, with a writer formed thereon. The reader and writer may be positioned so that one of the reader shields also functions as a pole for the writer. During construction of a multi-format piggyback head, the readers of the first array 502 are formed concurrently with the readers of the second array 504. Then the writers of the first array 502 are formed concurrently with the writers of the second array 504. The readers of the first and second arrays 502, 504 are aligned along a line transverse to the direction of media travel, and thus the writers of both arrays are also aligned. Likewise, for an interleaved head, the readers for both arrays 502,504 can all be formed during a single processing sequence, and the writers can be formed in another processing sequence.

The arrays can be slightly offset in a vertical direction for design considerations. For example, the upper shields for readers in the first array may be formed concurrently with the lower shields for readers in the second array. Then the readers in the second array are completed in subsequent steps. Thus, in some embodiments, the elements are formed concurrently in the same processing sequence, though only some of the processing steps affect both arrays 502, 504.

In further embodiments, the arrays can be formed by independent processing sequences. For example, one array can be completed prior to forming the other array. The arrays may be aligned in a direction transverse to the direction of tape motion, or can be displaced transverse to the direction of tape travel and offset in a direction parallel to the direction of tape travel.

Further, each array can be formed on an individual module, where the arrays in each format are displaced transverse to the direction of tape travel.

Forming the various arrays concurrently reduces process steps over the contemplated methods described above, such as forming elements in tandem parallel to the tape travel direction or even placing R/W arrays for different formats on different modules. One skilled in the art will appreciate the advantages achieved by processing all of the elements concurrently, including lower cost, faster production time, reduced chance of error, etc. Write and read transducer magnetic gaps may be independently optimized for each format.

Because the arrays 502,504 of elements are adjacent each other laterally, the width of the head may need to be increased slightly to ensure that the tape bearing surface supports the entire tape at all possible positions. However, the width of the head does not necessarily need to increase.

Figure 6:
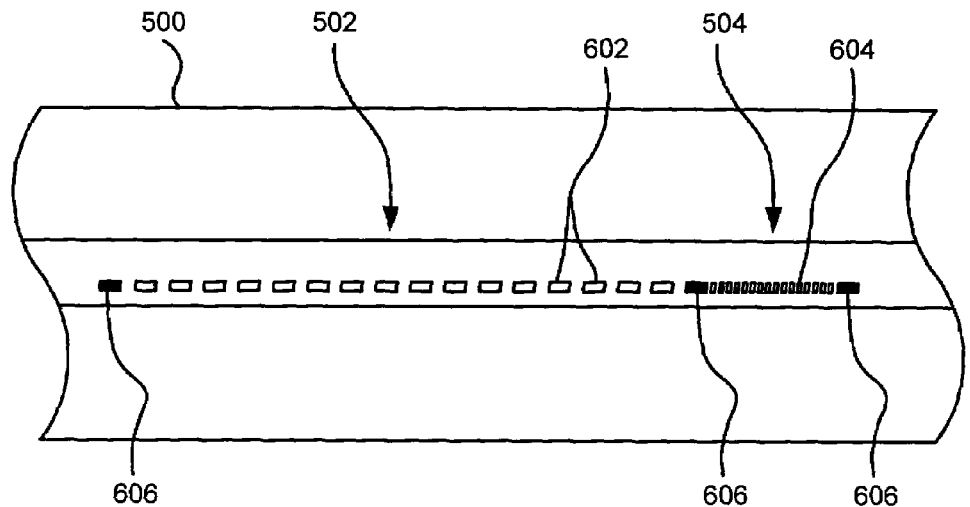
FIG. 6 is a detailed view taken from Circle 6 of FIG. 5 showing two arrays of elements according to one embodiment.
Figure 7:
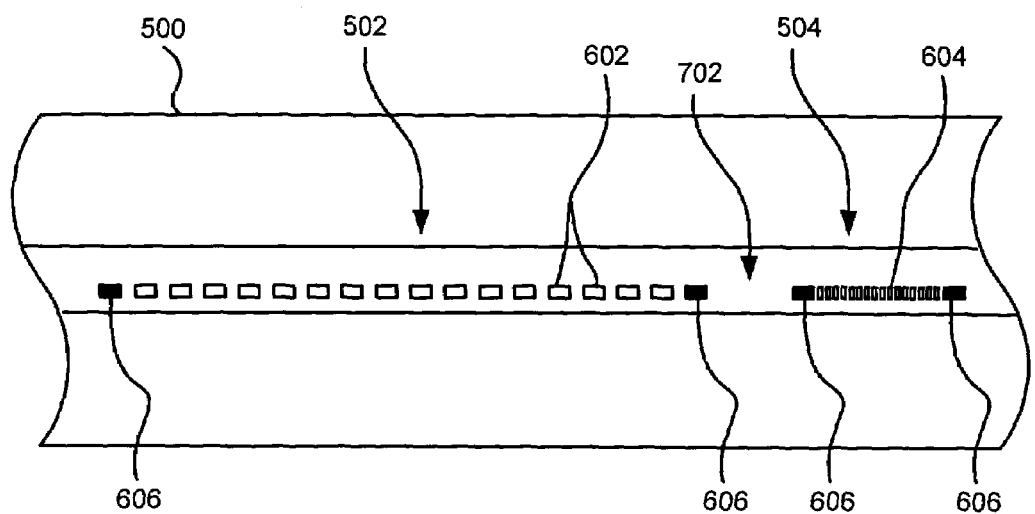
FIG. 7 is a detailed view of a tape bearing surface of a tape head showing two arrays of elements spaced apart laterally.

One embodiment of the present invention is illustrated in FIG. 6, wherein two arrays 502, 504 are formed on a module 500. As shown, the elements 602 of the first array 502 and the elements 604 of the second array 504 are positioned generally laterally adjacent each other. In some embodiments, including this one, the first and second arrays 502, 504 can share one of the servo readers 606. However, it may be advantageous to space the second array 504 laterally from the first array 502, as shown in FIG. 7. One advantage of spacing the arrays 502, 504 apart is that, because portions of the tape near or at the edges of the tape may tend to induce more wear on the head than other parts of the tape, the area of greatest wear may then be between the arrays (when reading outer data bands). This is particularly so with older tapes that tend to be rougher and thicker, and produce more wear than newer tapes, as newer tapes are designed to reduce wear. The consequence of the uneven wear pattern is that when reading and writing the outer band of a tape in the first format with the first array 502, the edge of the tape might cause wear adjacent to the first array 502, and thus on the second array 504. By having the arrays spaced apart slightly, wear from the edge portions of the tape will occur between the arrays, e.g., in area 702.

It is worth noting that the same uneven wear patterns might occur when reading and writing using the second array 504, i.e., the edge portions of the tape will cause more wear adjacent the second array 504, and as such, the wear will likely occur on the first array 502. However, assuming the second array 504 is for a format that is more modern than the format of the first array 502, the tape will likely be a newer tape that is smoother. Further, the first array 502, probably having larger elements and reading a lower linear density, may be more tolerant to wear. Furthermore, all elements may be provided with a wear resistant coating such as diamond-like carbon.

Figure 8:
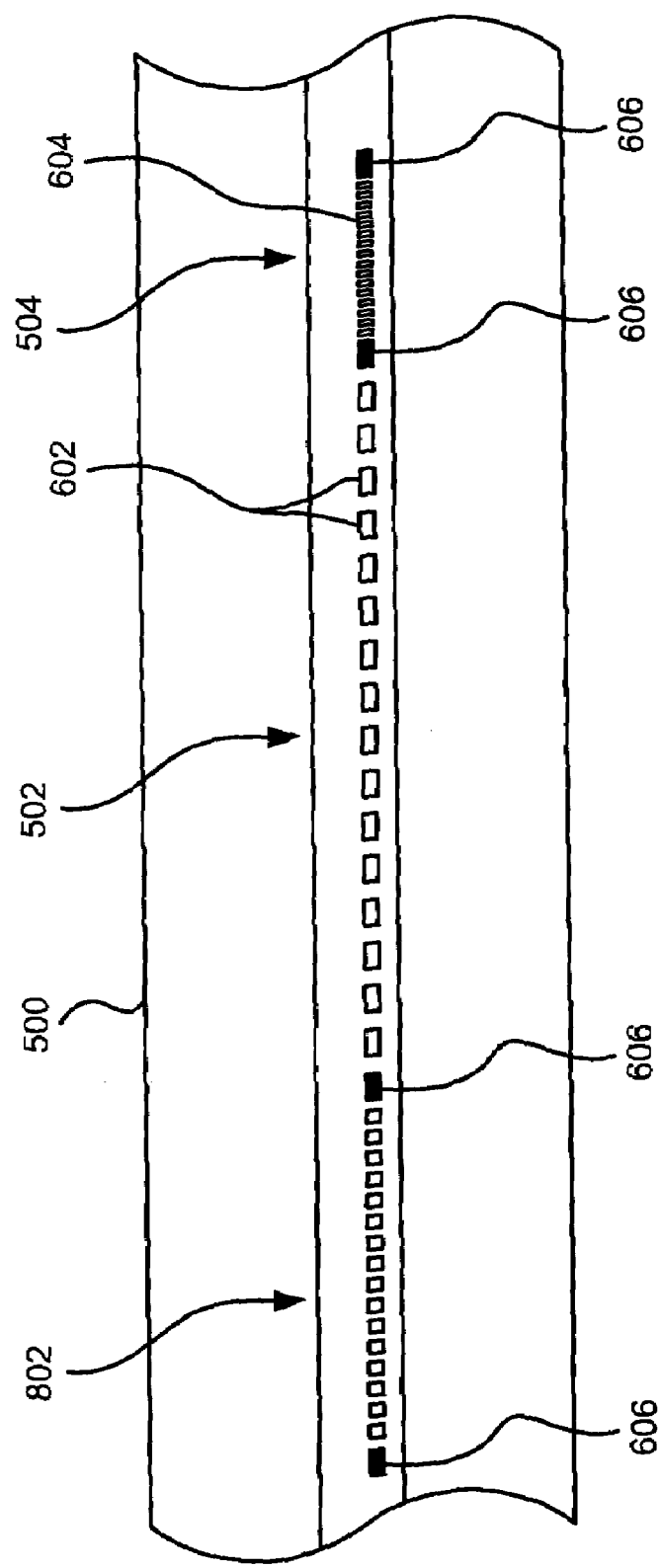
FIG. 8 is a detailed view of a tape bearing surface of a tape head showing three arrays of elements, each for a different format.

Additional embodiments have more than two arrays of elements aligned on a single module, each array associated with a different format. FIG. 8 illustrates an embodiment where three arrays 502, 504, 802 of elements are present. Again, the arrays may share servo elements or not.

Figure 9:
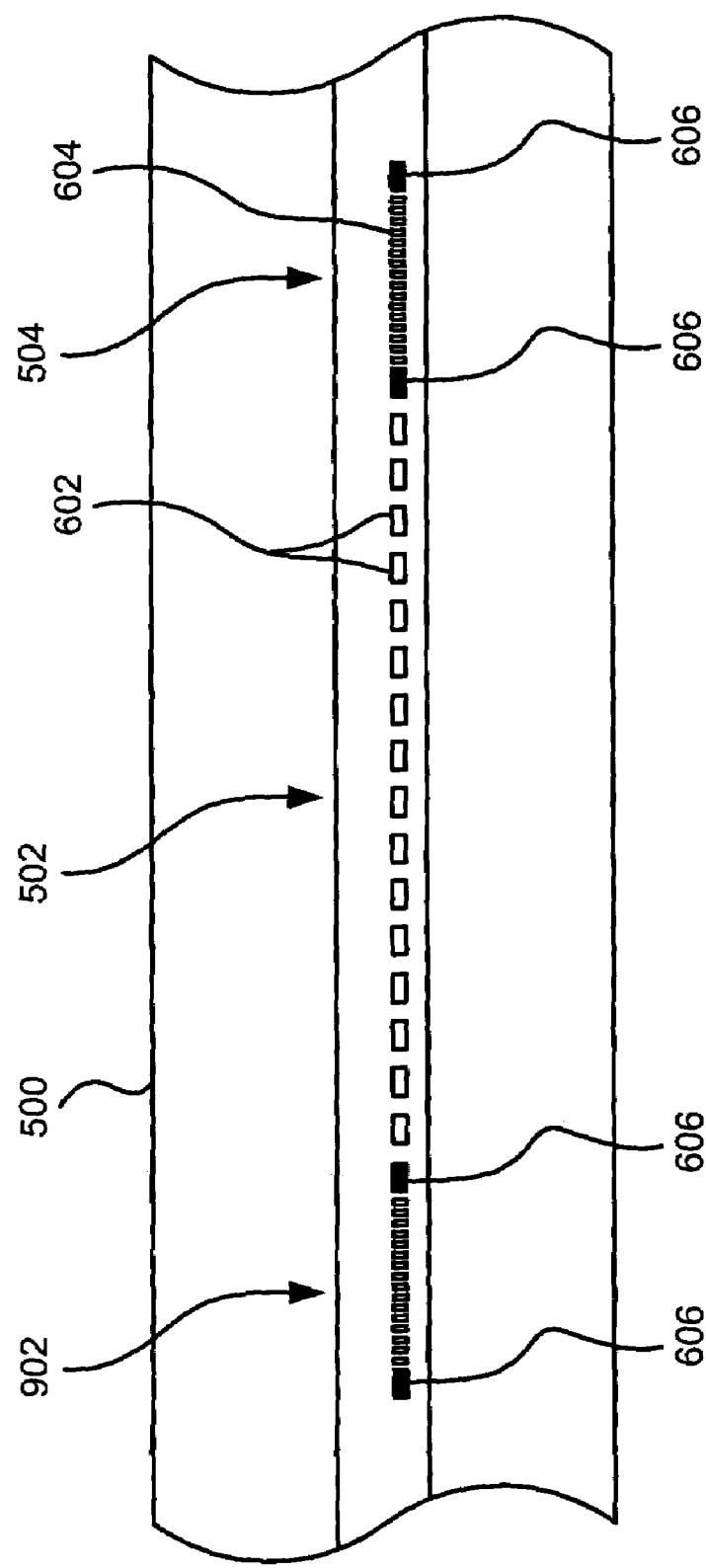
FIG. 9 is a detailed view of a tape bearing surface of a tape head showing three arrays of elements, where one of the arrays is for a first format and two of the arrays are for a second format.

If head width is a critical issue, and assuming that the second array 504 is less wide than the first array 502 in a direction transverse to the array of elements, a second array 504 and a substantially identical third array 902 can be formed, one on either side of the first array 502. This embodiment is shown in FIG. 9. For data tracks in the second format and positioned on the left side of the tape, the third array 902 (on the left) will read and write data track in the second format on the left side of the tape. For data tracks in the second format and on the right side of the tape, the second array 504 (on the right) will read and write. In this way, the head does not need to have a width that is more than would be required to read or write using the first array 502. Rather, one or both of the second array 504 and the third array 902 will be over data tracks in the second format at any point where the first array 502 is over the tape, thereby reducing the lateral range of motion required for the head to access all data tracks on the tape. Thus, for example, the head need not be wide enough to allow the first array 502 to extend beyond the left edge of the tape to allow the second array 504 to read data along the left tape edge. Rather, the data along the left tape edge can be read by the third array 902. Additionally, fabricating both the second and third arrays 504, 902 may enable using only one chip image for fabricating both left and right modules in a two module head rather than requiring individual chip images or wafers for left and right modules.

In another mode of use, multiple formats can be written to the same tape. Because the arrays are aligned transverse to the tape travel direction, data in each format can be simultaneously written along the tape. This feature would allow, for instance, data to be written in two parallel tracks on the same tape and sent to users having a tape drive capable of reading only one of the formats. Because many blank tapes are sold with servo information already written thereto, some embodiments may require tapes that have servo information for both formats thereon. Other embodiments may write servo information simultaneously with the data, and servo writers would be present in each array. Yet other embodiments may allow writing of the new format onto an adjacent data band. For example, if the tape has four data bands, the bands can be grouped into two pairs. Using the servo track between the pair of bands to align the arrays over each band, one format can be written to one band and another format to the other band. The latter may not be optimal for the newer format, which might require an improved servo data band.

Figure 10:
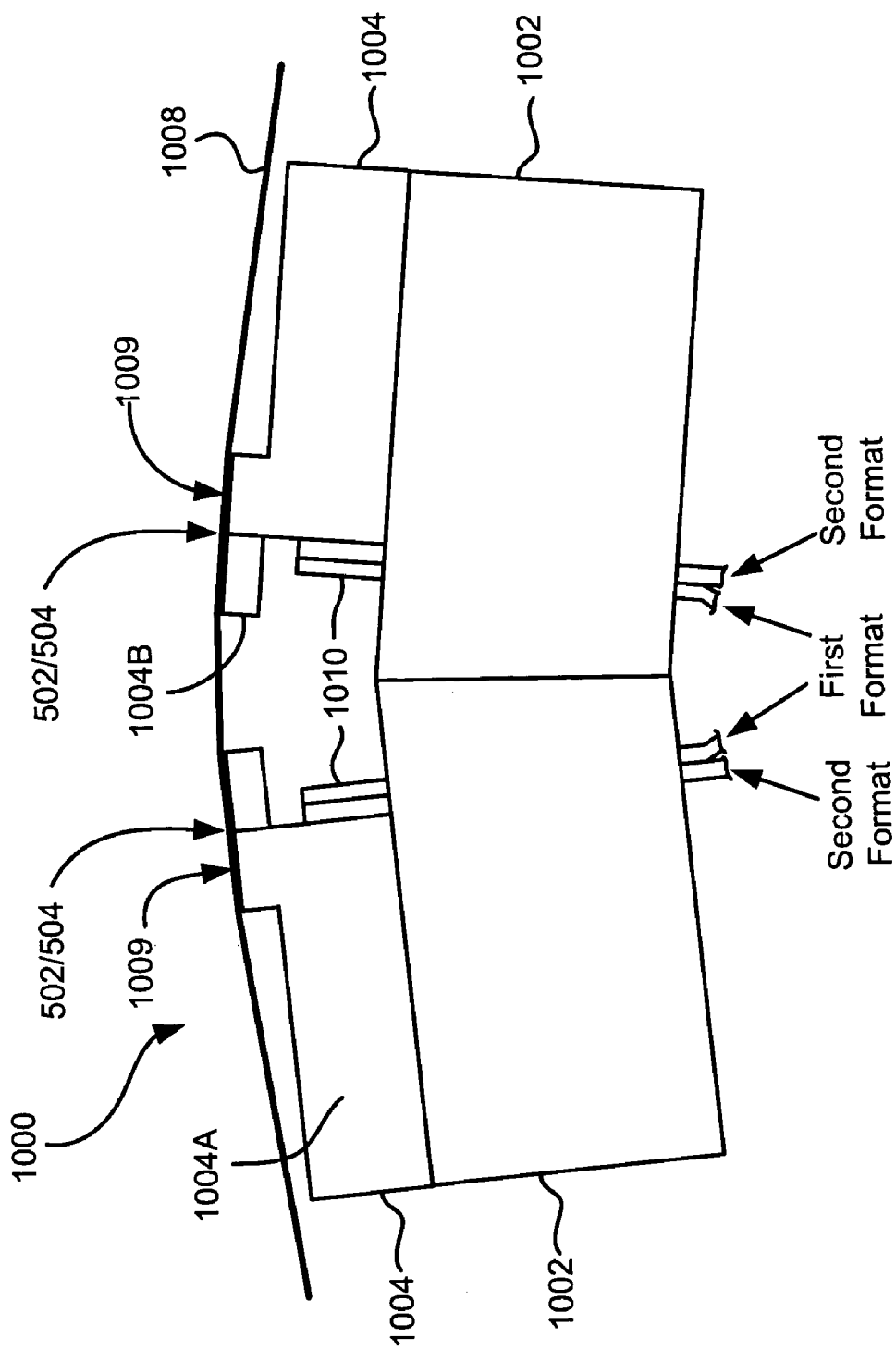
FIG. 10 is a side view of a tape head having two modules according to one embodiment.

As mentioned above, one way to build the head is to have two modules, in a configuration similar to existing heads, e.g., the head of FIG. 1. One such embodiment is shown in FIG. 10 illustrates a flat-lapped bi-directional, two-module magnetic tape head 1000. As shown, the head includes a pair of bases 1002, each equipped with a module 1004. The bases may be conventional U-beams that are adhesively coupled together. Each module 1004 includes a substrate 1004A and a closure 1004B with multiple arrays 502, 504 situated therebetween. Cables 1010 connect the elements to a controller. The cables 1010 are shown as split into leads for the two formats, but can be joined, fused, intermixed, overlayed, etc. In use, a tape 1008 is moved over the modules 1004 along the tape bearing surfaces 1009 thereof for reading and writing data on the tape 1008. Depending on the format of the data or servo on the tape, the array 502 or 504 on each module corresponding to that format is activated and used to read and/or write to the tape. Another way to build the head is to have the functions of reading and writing performed on different modules. As shown in the write-read-write (W-R-W) head 1100 of FIG. 11, outer writing modules 1102, 1104 flank a single reading module 1106. As the names imply, the outer modules 1102, 1104 include two or more arrays of writers in a configuration, for example, as shown in FIGS. 6-9. The reading module 1106 includes two or more arrays of readers. The modules 1102, 1104, 1106 are offset and set in relationship with each other such that internal wrap angles are defined between the modules 1102, 1104, 1106. Cables 1109 connect the elements to a controller. The cables 1109 are shown as split into leads for the two formats, but can be joined, fused, intermixed, overlayed, etc.

In this embodiment, the tape bearing surfaces of the modules lie on parallel planes, but are offset in a direction perpendicular to the planes. When the tape 1108 moves across the head 1100 as shown, air is skived from below the tape 1108 by a skiving edge 1110 of the first outer writing module 1102, and instead of the tape 1108 lifting from the tape bearing surface 1112 of the first outer module 1102 (as intuitively it should), the reduced air pressure in the area between the tape 1108 and the tape bearing surface 1112 allow atmospheric pressure to urge the tape towards the tape bearing surface 1112. The trailing end 1120 of the outer writing module 1102 (the end from which the tape leaves the outer writing module 1102) is the reference point which defines the wrap angle $\alpha_o$ over the tape bearing surface of the inner reading module 1106. The same is true of the other outer writing module 1104 when the tape travel direction is reversed.

Figure 11:
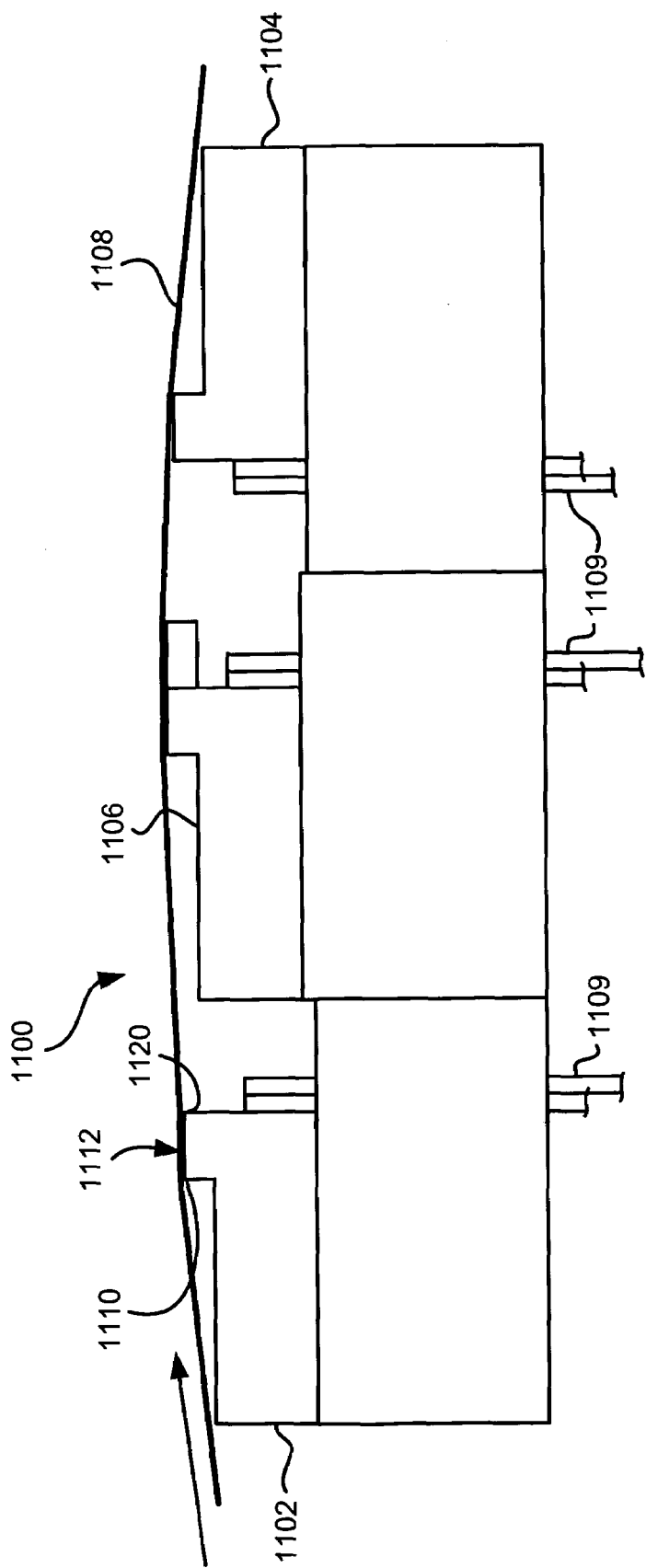
FIG. 11 is a side view of a tape head having three modules according to one embodiment.

Variations on the head 1100 of FIG. 11 include a R-W-R head, a R-R-W head, a W-W-R head, etc. For example, in a R-W-R head, the outer modules 1102, 1104 perform reading while the middle module 1106 performs writing. In a R-R-W head, the leading module 1102 and middle module 1106 perform reading while the trailing module 1104 performs writing. In a W-W-R head, the leading module 1102 and middle module 1106 perform writing while the trailing module 1104 performs reading. Again, the leading and trailing modules 1102, 1104 may operate concurrently with each other and the middle module 1106, may operate individually, or may operate in combinations of two modules.

An advantage of the multiple module head is that each module has no more wiring leads than a module in a two module head having both read and write elements. For instance, assume a legacy format head has 16 readers and 16 writers per module. Adding an array of second format elements would add 32 more elements, or 64 more wires. However, if each module has only readers or writers, albeit in two formats, the number of wires per module is the same as the legacy read/write head. Accordingly, existing cabling can be used, the number of wires per head is minimized, etc.

Another advantage is that air is entrained between the tape and the trailing outer module (1104 in FIG. 11), thereby reducing wear.

The three module design is also preferred, as the total gap thicknesses and build complexity are minimized, and head yield is optimized.

The invention is not limited to flat profile heads; heads having rounded and other geometric tape bearing surfaces are also within the spirit and scope of the present invention.

In any of the embodiments described herein, the heads can be fabricated in conventional ways. To reduce cost and complexity, one lead for an element of the first array may be commoned with one lead for an element of the second array (and so on for additional arrays) to minimize head wiring, an on-going goal in head design.

Figure 12:
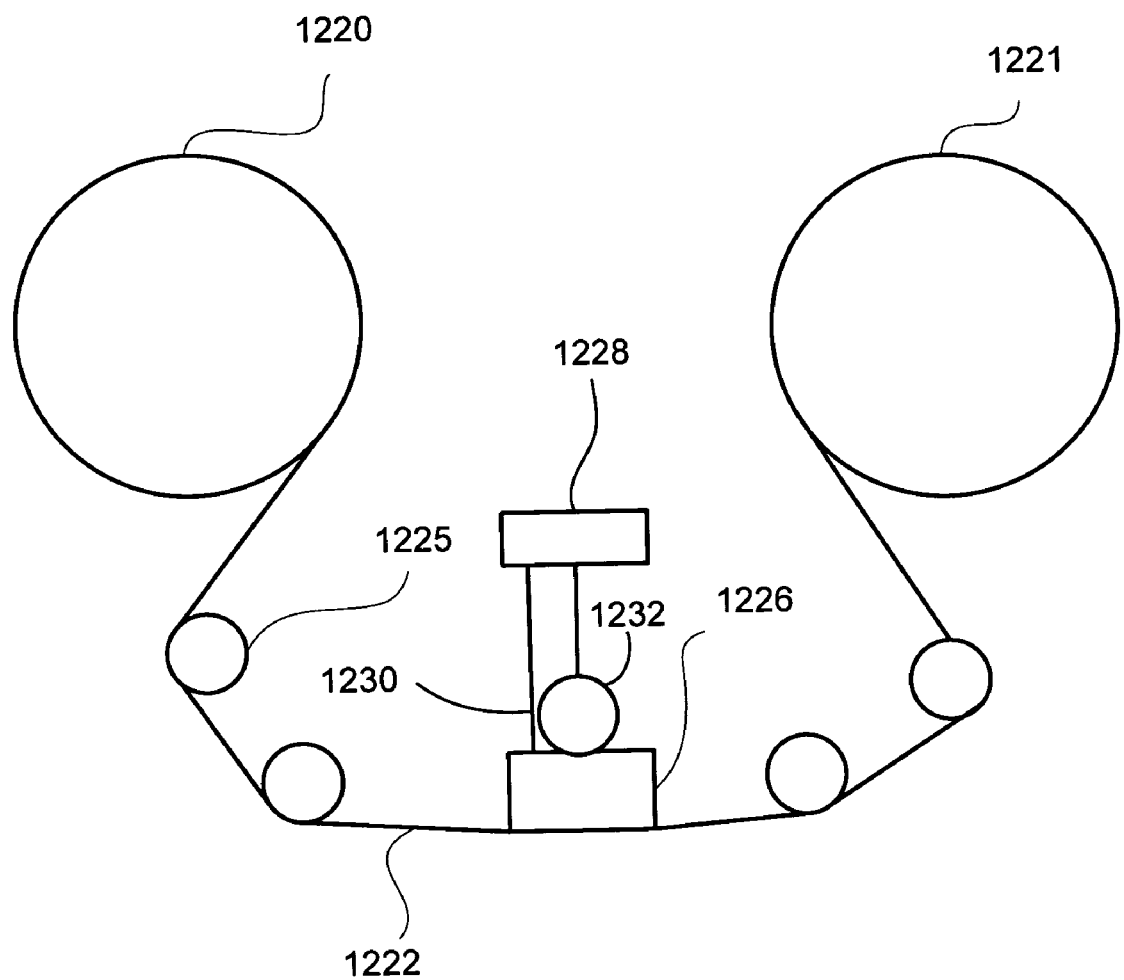
FIG. 12 is a schematic diagram of the tape drive system.

FIG. 12 illustrates a simplified tape drive which may be employed in the context of the present invention. While one specific implementation of a tape drive is shown in FIG. 12, it should be noted that the embodiments of the previous figures may be implemented in the context of any type of tape drive system.

As shown, a tape supply cartridge 1220 and a take-up reel 1221 are provided to support a tape 1222. These may form part of a removable cassette and are not necessarily part of the system. Guides 1225 guide the tape 1222 across a preferably bidirectional tape head 1226, of the type disclosed herein. Such tape head 1226 is in turn coupled to a controller assembly 1228 via an MR connector cable 1230. The controller 1228, in turn, controls head functions such as servo following, write bursts, read functions, etc. An actuator 1232 controls position of the head 1226 relative to the tape 1222.

A tape drive, such as that illustrated in FIG. 12, includes drive motor(s) to drive the tape supply cartridge 1220 and the take-up reel 1221 to move the tape 1222 linearly over the head 1226. The tape drive also includes a read/write channel to transmit data to the head 1226 to be recorded on the tape 1222 and to receive data read by the head 1226 from the tape 1222. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
    a first module having a closure, a substrate, and a gap between the closure and substrate, the gap having:
        a first array of elements associated with a first data format, the elements of the first array being selected from a group consisting of readers, writers, and combinations thereof; and
        a second array of elements associated with a second data format, the elements of the second array being selected from a group consisting of readers, writers, and combinations thereof,
        wherein the first and second arrays of elements are adjacent each other generally laterally in a direction transverse to a direction of travel of a magnetic medium over the head;
    a second module having a tape bearing surface spaced from a tape bearing surface of the first module and aligned with the first module parallel to the direction of travel of the magnetic medium, the second module having a closure, a substrate, and a gap between the closure and substrate, the gap having:
        a third array of elements associated with the first data format, the elements being selected from a group consisting of readers, writers, and combinations thereof; and
        a fourth array of elements associated with the second data format,
        wherein the third and fourth arrays of elements are positioned generally laterally adjacent each other in a direction transverse to the direction of travel of the magnetic medium over the head,
    wherein outer elements of the third array of elements are aligned with outer elements of the first array of elements along lines oriented parallel to the direction of travel of the magnetic medium,
    wherein outer elements of the fourth array of elements are aligned with outer elements of the second array of elements along lines oriented parallel to the direction of travel of the magnetic medium, wherein the first and second arrays share a servo reader, wherein the servo reader shared by the first and second arrays is used to read servo tracks in the first and second data formats.

2. The head as recited in claim 1, wherein the first and second arrays include readers, the readers being aligned laterally along a line transverse to the direction of travel of the magnetic medium over the head.

3. The head as recited in claim 2, wherein the readers of both arrays have been formed in a same processing sequence.

4. The head as recited in claim 1, wherein the first and second arrays include writers, the writers being aligned laterally along a line transverse to the direction of travel of the magnetic medium over the head.

5. The head as recited in claim 4, wherein the writers of both arrays have been formed in a same processing sequence.

6. The head as recited in claim 1, further comprising a third array of elements associated with a third data format, the elements of the third array being selected from a group consisting of readers, writers, and combinations thereof, the third array being generally laterally adjacent the first or second array in a direction transverse to a direction of travel of a magnetic medium over the head.

7. The head as recited in claim 1, further comprising a third array of elements associated with the second data format, the elements of the third array being selected from a group consisting of readers, writers, and combinations thereof, the third array being generally laterally adjacent the first array on an opposite side thereof as the second array.

8. The head as recited in claim 1, wherein the first and second arrays each have an additional servo reader, wherein the additional servo reader of the first array is positioned on an opposite side of the first array as the shared servo reader, wherein the additional servo reader of the second array is positioned on an opposite side of the second array as the shared servo reader, wherein the additional servo reader of the first array is used to read servo tracks in the first data format, wherein the additional servo reader of the second array is used to read servo tracks in the second data format.

9. The head as recited in claim 1, wherein the first and second arrays are spaced apart in the direction transverse to the direction of media travel.

10. The head as recited in claim 1, wherein the second array is a scaled version of the first array.

11. The head as recited in claim 1, wherein the elements of the second array vary from the elements of the first array by element size.

12. The head as recited in claim 1, wherein the elements of the second array vary from the elements of the first array by spacing between adjacent elements.

13. The head as recited in claim 1, wherein the only one of the arrays is active during operation of the head.

14. The head as recited in claim 1, wherein both of the arrays are active during operation of the head.

15. The head as recited in claim 14, wherein data in the first and second formats are written simultaneously by the first and second array.

16. The head as recited in claim 14, wherein data in the first and second formats are read simultaneously by the first and second array.

17. A tape drive system, comprising:
a head, further comprising:
   a first array of elements associated with a first data format, the elements of the first array being selected from a group consisting of readers, writers, and combinations thereof; and
   a second array of elements associated with a second data format, the elements of the second array being selected from a group consisting of readers, writers, and combinations thereof,
   wherein the first and second arrays of elements are positioned generally laterally adjacent each other along a line oriented in a direction transverse to a direction of travel of a magnetic medium over the head,
   wherein the first and second arrays share a servo reader,
   wherein the shared servo reader is used to read servo tracks in the first and second data formats,
   wherein the servo reader is positioned along the line oriented in a direction transverse to a direction of travel of a magnetic medium over the head;
a drive mechanism for passing a magnetic recording tape over the head; and
a controller in communication with the head.

18. The head as recited in claim 17, wherein the first and second arrays each have an additional servo reader, wherein the additional servo reader of the first array is positioned on an opposite side of the first array as the shared servo reader, wherein the additional servo reader of the second array is positioned on an opposite side of the second array as the shared servo reader, wherein the additional servo reader of the first array is used to read servo tracks in the first data format, wherein the additional servo reader of the second array is used to read servo tracks in the second data format.

19. A magnetic head, comprising:
a first module having:
   a first array of elements associated with a first data format, the elements of the first array being selected from a group consisting of readers, writers, and combinations thereof; and
   a second array of elements associated with a second data format, the elements of the second array being selected from a group consisting of readers, writers, and combinations thereof,
   wherein the first and second arrays of elements are positioned generally laterally adjacent each other in a direction transverse to a direction of travel of a magnetic medium over the head,
a second module having:
   a third array of elements associated with the first data format, the elements being selected from a group consisting of readers, writers, and combinations thereof; and
   a fourth array of elements associated with the second data format,
   wherein the third and fourth arrays of elements are positioned generally laterally adjacent each other in a direction transverse to the direction of travel of the magnetic medium over the head,
wherein the third array of elements is aligned with the first array of elements in the direction of travel of the magnetic medium,
wherein the fourth array of elements is aligned with the second array of elements in the direction of travel of the magnetic medium,
wherein the first and second modules each have a planar tape bearing surface, wherein the tape bearing surfaces lie along substantially parallel planes, wherein the planes are offset from each other in a direction perpendicular to one of the planes, wherein the first module has a skiving edge, wherein the skiving edge of the first module reduces air pressure in an area between the magnetic medium and the tape bearing surface of the first module;

wherein the second module has a skiving edge, wherein the skiving edge of the second module reduces air pressure in an area between the magnetic medium and the tape bearing surface of the second module;

wherein the modules are set in relationship with each other such that an internal wrap angle of the magnetic medium relative to the tape bearing surface of one of the modules is defined between the modules.

20. The head as recited in claim 19, further comprising a third array of elements associated with a third data format, the elements of the third array being selected from a group consisting of readers, writers, and combinations thereof, the third array being positioned generally laterally adjacent the first or second array in a direction transverse to a direction of travel of a magnetic medium over the head.

21. The head as recited in claim 19, further comprising a third array of elements associated with the second data format, the elements of the third array being selected from a group consisting of readers, writers, and combinations thereof, the third array being positioned generally laterally adjacent the first array on an opposite side thereof as the second array.

22. The head as recited in claim 19, wherein the first and second arrays share a servo reader, wherein the servo reader shared by the first and second arrays is used to read servo tracks in the first and second data formats.

23. The head as recited in claim 22, wherein the first and second arrays each have an additional servo reader, wherein the additional servo reader of the first array is positioned on an opposite side of the first array as the shared servo reader, wherein the additional servo reader of the second array is positioned on an opposite side of the second array as the shared servo reader, wherein the additional servo reader of the first array is used to read servo tracks in the first data format, wherein the additional servo reader of the second array is used to read servo tracks in the second data format.

24. The head as recited in claim 19, wherein the first and second arrays are spaced apart in the direction transverse to the direction of media travel.

25. The head as recited in claim 19, wherein the second array is a scaled version of the first array.

26. The head as recited in claim 19, further comprising a third module aligned with the first module in a direction parallel to the direction of travel of the magnetic medium and positioned on an opposite side of the second module relative to the first module, the third module comprising a fifth array of elements associated with the first data format, and a sixth array of elements associated with the second data format, wherein the elements of the third module are only readers.

27. A magnetic head, comprising:
a first module having a first array of elements associated with a first data format, and a second array of elements associated with a second data format, the elements being selected from a group consisting of readers, writers, and combinations thereof, wherein the first and second arrays of elements are positioned generally laterally adjacent each other in a direction transverse to a direction of travel of a magnetic medium over the head; and a second module aligned with the first module parallel to the direction of travel of the magnetic medium, the second module having a third array of elements associated with the first data format, and a fourth array of elements associated with the second data format, the elements being selected from a group consisting of readers, writers, and combinations thereof, wherein the third and fourth arrays of elements are positioned generally laterally adjacent each other in a direction transverse to the direction of travel of the magnetic medium over the head, wherein the first and third arrays of elements are aligned in the direction of travel of the magnetic medium over the head, wherein the second and fourth arrays of elements are aligned in the direction of travel of the magnetic medium over the head, wherein the first and second modules each have a planar tape bearing surface, wherein the tape bearing surfaces lie along substantially parallel planes, wherein the planes are offset from each other in a direction perpendicular thereto, wherein the modules are set in relationship with each other such that an internal wrap angle of the magnetic medium relative to the tape bearing surface of one of the modules is defined between the modules.

28. The head as recited in claim 27, wherein the elements of the first module are only readers and the elements of the second module are only writers.

29. The head as recited in claim 28, wherein the first and second arrays share a servo reader, wherein the third and fourth arrays share a servo reader.

30. The head as recited in claim 27, further comprising a third module aligned with the first module in a direction parallel to the direction of travel of the magnetic medium and positioned on an opposite side of the first module relative to the second module, the third module comprising a fifth array of elements associated with the first data format, and a sixth array of elements associated with the second data format, wherein the elements of the third module are only writers.

31. A tape drive system, comprising:
a head as recited in claim 27;
a drive mechanism for passing a magnetic recording tape over the head; and
a controller in communication with the head.

32. A magnetic head, comprising:
a first array of elements associated with a first data format, the elements of the first array being selected from a group consisting of readers, writers, and combinations thereof; and
a second array of elements associated with a second data format, the elements of the second array being selected from a group consisting of readers, writers, and combinations thereof,
wherein the first and second arrays of elements are adjacent each other generally laterally in a direction transverse to a direction of travel of a magnetic medium over the head,
wherein the first and second arrays share a servo reader, wherein the servo reader shared by the first and second arrays is used to read servo tracks in the first and second data formats.

* * * * *